United States Patent [19]

Saglio

[11] Patent Number: 4,635,241
[45] Date of Patent: Jan. 6, 1987

[54] ULTRASONIC DEVICE

[75] Inventor: Robert Saglio, Antony, France

[73] Assignee: Commissariat a l'Energie Atomique, Paris, France

[21] Appl. No.: 525,343

[22] Filed: Aug. 22, 1983

[30] Foreign Application Priority Data

Aug. 31, 1982 [FR] France ............................. 82 14855

[51] Int. Cl.⁴ .......................................... G01S 15/06
[52] U.S. Cl. ...................................... 367/95; 367/96; 367/99; 367/103
[58] Field of Search ................... 367/87, 95, 96, 99, 367/103, 104

[56] References Cited

U.S. PATENT DOCUMENTS 2,743,429  4/1956  Erdman et al. ...................... 367/95
3,149,561  9/1964  Lancaster ......................... 367/96 X
4,206,511  6/1980  Ries et al. ........................ 367/96
4,235,112  11/1980 Kaiser .............................. 367/96 X

FOREIGN PATENT DOCUMENTS 2032104  4/1980  United Kingdom .

Primary Examiner—Richard A. Farley
Attorney, Agent, or Firm—Pearne, Gordon, Sessions, McCoy, Granger & Tilberry

[57] ABSTRACT

The device comprises at least two ultrasonic transducers emitting focused radiation and a circuit making it possible to measure the difference between the sampled signals supplied by these two transducers. This difference is cancelled out when the probe faces the object.

Application to metrology and the position control of objects.

4 Claims, 9 Drawing Figures

ULTRASONIC DEVICE

BACKGROUND OF THE INVENTION

The present invention relates to an ultrasonic device for determining the existence and/or the position of an object. It is used in metrology and particularly in the position control of various objects, as for example the fuel assembly rods of nuclear reactors during inspections.

In per se known manner as ultrasonic probe comprises an ultrasonic transducer, a supply circuit for said transducer consisting of an electrical pulse generator and a circuit for processing the signal supplied by the transducer in response to the ultrasonic echoes which it receives, said echoes coming from the various obstacles present on the path of the ultrasonic beam.

By means of such a probe it is possible to determine the position of an object, e.g. the axis of a cylinder. For this purpose it is merely necessary to move the probe in a direction perpendicular to said axis and plot the amplitude of the signal supplied by the transducer. This amplitude is firstly zero when the probe does not face the cylinder and then increases when the ultrasonic beam starts to strike the cylinder. It then passes through a maximum when the transducer faces the cylinder axis and then decreases and finally becomes zero again. The passage through the maximum indicates the position of the axis of A device can be included in a system for regulating the position of the determined object (or in a loop making this position dependent on that of the probe). For this purpose, it is merely necessary to associate therewith means for acting on the position of the object, in order to make the signal supplied by the probe maximum.

Such a position control is a problem occurring e.g. during the inspection of fuel assembly rods of nuclear reactors. These rods must be position controlled with respect to an observation window, throughout the time when they pass in front thereof. The ultrasonic probe is then integral with the window and the rod is displaced in such a way that it is correctly centered relative to the window.

The disadvantage of the aforementioned location device is that it leads to an indefiniteness with regards to the correction direction to be made to the position of the object. Thus, the signals used for controlling the displacement of the object is an error curve, for which the variation of the signal always has the same sign relative to the maximum value. In other words, the function representing the signal is even. Thus, a priori, no information is possible on the direction in which it is necessary to move the object in order to make the detected amplitude maximum.

SUMMARY OF THE INVENTION

The present invention relates to a locating device obviating the aforementioned disadvantage, in the sense that it supplies an uneven character signal making it possible to define the variation with respect to a reference value, not only as regards magnitude, but also as regards the sign. The invention also makes it possible to detect the presence of objects having given profiles, as a result of the adaptation of the device to the objects to be recognized.

According to the invention, these objectives are achieved through the use of an ultrasonic probe comprising at least two transducers, by the sampling of the signals supplied by the transducers and by the formation of a difference signal between the sampled signals.

More specifically, the present invention relates to a device for locating an object, comprising an ultrasonic probe, a supply circuit for said probe and a circuit for processing the signals supplied by the probe, wherein the probe is constituted by at least two ultrasonic transducers, each of which emits an ultrasonic wave beam focused on a focal spot, the two focal spots of the two transducers being displaced with respect to one another in one direction and wherein the processing circuit comprises a circuit for sampling the signals supplied by the two transducers and for holding the same value and a circuit able to form a different signal between the held, sampled signals corresponding to the two transducers.

The difference signal gives the position of the object and, by its shape, makes it possible to detect the existence of an object.

Preferably, the device according to the invention also comprises means for modifying the position of the probe relative to the object in the said direction.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
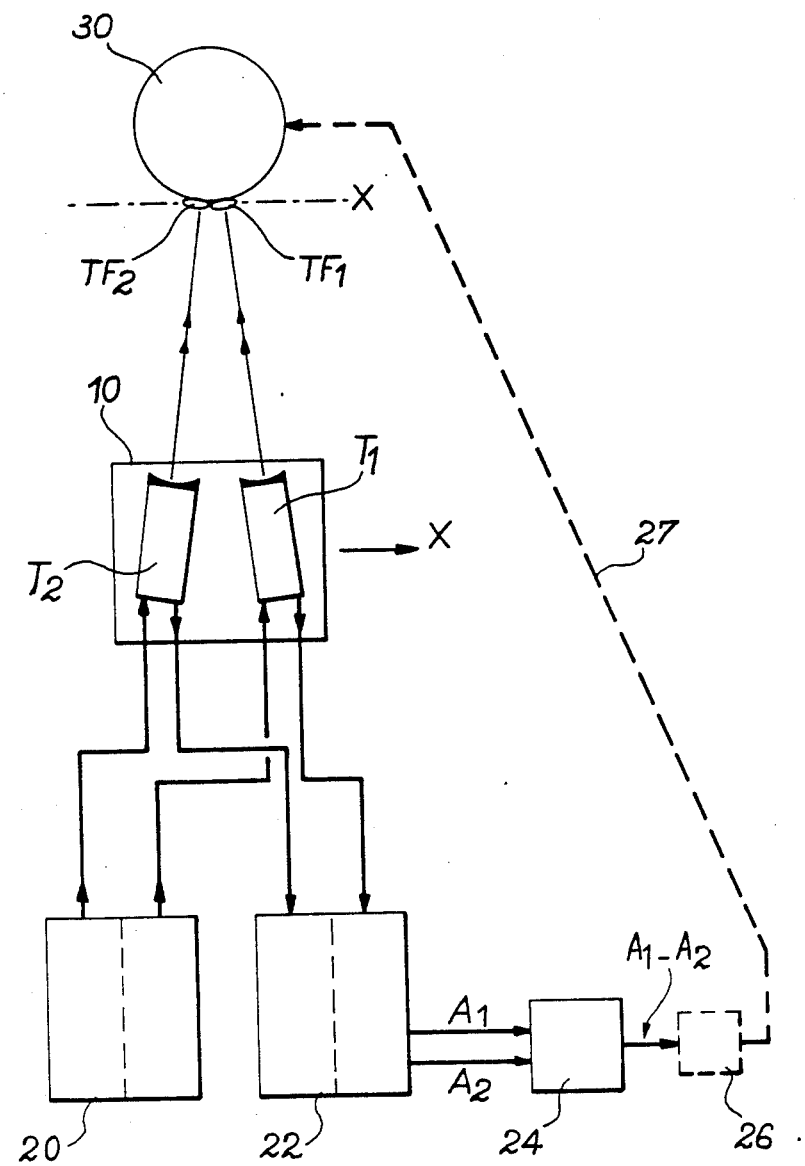
FIG. 1 a general diagram of the device according to the invention.

As shown in FIG. 1, the device according to the invention comprises:

a probe 10 constituted by two ultrasonic transducers $T_1$, $T_2$, each emitting an ultrasonic wave beam focused on a focal spot, respectively $TF_1$ and $TF_2$, the two focal spots being displaced with respect to one another in a direction X, a supply circuit 20 for the two transducers, a circuit 22 comprising an amplifier for the signals supplied by the two transducers and incorporating two sample and hold circuits, circuit 22 supplying two signals $A_1$ and $A_2$, a circuit 24 able to form a difference signal equal to $A_1 - A_2$.

A sample and hold circuit is any circuit able to take the maximum amplitude of a pulse and maintain a signal equal to such an amplitude.

Figure 5:
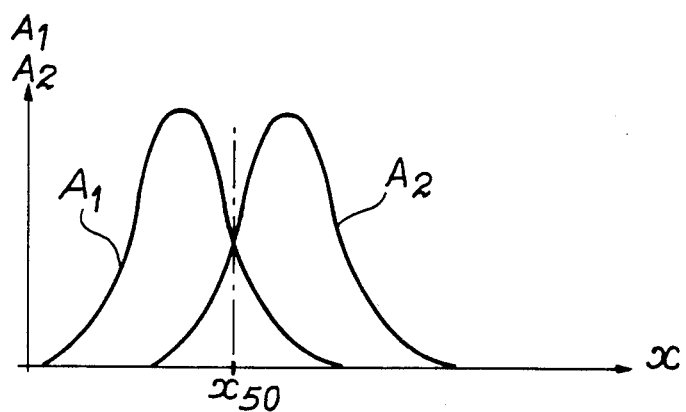
FIG. 5 the configuration of the amplitude variations of the signals from the two transducers in the case of FIG. 4.

The signals supplied by circuit 22 are staircase signals (due to the sampling at the maximum value of the echo signal and the maintaining of said value). The envelope of these signals is shown in FIG. 5. It is clear that the echo signals are not processed in real time, because they are held at a sampled value.

The device may optionally comprise a circuit 26 able to detect the time at which the difference signal is cancelled out.

The device can optionally be completed by a not shown means able to move probe 10 in direction X or able to move the object in the same direction, with the probe remaining fixed.

Figure 2:
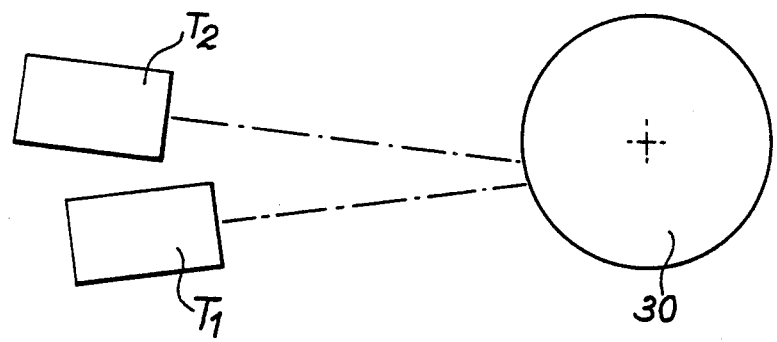
FIG. 2 a special arrangement of the two transducers.

According to a preferred, but not obligatory arrangement, the two two transducers $T_1$ and $T_2$ are displaced relative to one another in the ultrasonic wave transmission direction. In other words, the distances between the transducers and the object 30 to be located (sometimes called the "water level" because the transducers are immersed in a coupling liquid) are not the same. This case is illustrated in FIG. 2 and then the echo pulses corresponding to the same object and supplied by the two transducers, are staggered in time in the manner illustrated by the graph of FIG. 3. A transmission pulse 40 is followed by a first echo 41 from transducer $T_1$, which is closest to the object to be located and a second echo 42 from transducer $T_2$, which is furthest therefrom.

This arrangement has the object of permitting the regrouping of the amplification circuits to a single circuit operating alternatively on one of the echoes and then on the other, because the two echoes are separated in time.

Naturally, the supply circuits can also be advantageously grouped into a single circuit, whereby the transducers are then excited in parallel.

It is also possible to use only a single amplification circuit with the transducers both at the same distance from the object, but whilst supplying them by means of two separate circuits exciting the two transducers at different times.

Figure 4:
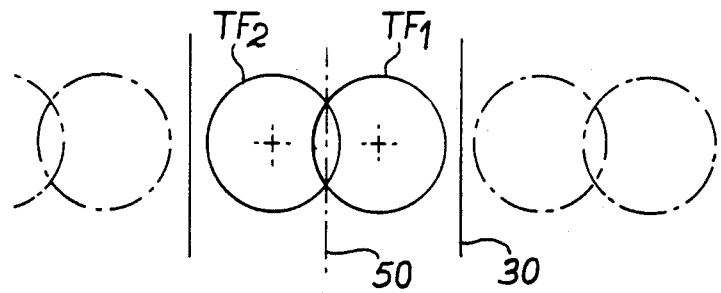
FIG. 4 the case where the focal spots of the two ultrasonic beams partly overlap.

With regards to the relative arrangement of the ultrasonic beams in space, several variants are possible as a function of the shape of the object to be treated. In the case of FIG. 4, it is a question of locating the position of the median plane 50 of a cylindrical object 30 (in other words its axis). The two focal spots $TF_1$ and $TF_2$ then partly overlap. During the movement of the probe in direction X, the sampled signals corresponding to the two transducers have the shape or configuration of FIG. 5, in which their amplitude is plotted on the ordinate and the displacement X on the abscissa. The difference signal $A_1-A_2$ has the shape shown in FIG. 6. On abscissa $X_{50}$, signals $A_1$ and $A_2$ are equal and the difference signal is zero. This abscissa corresponds to the axis of the object.

Figure 6:
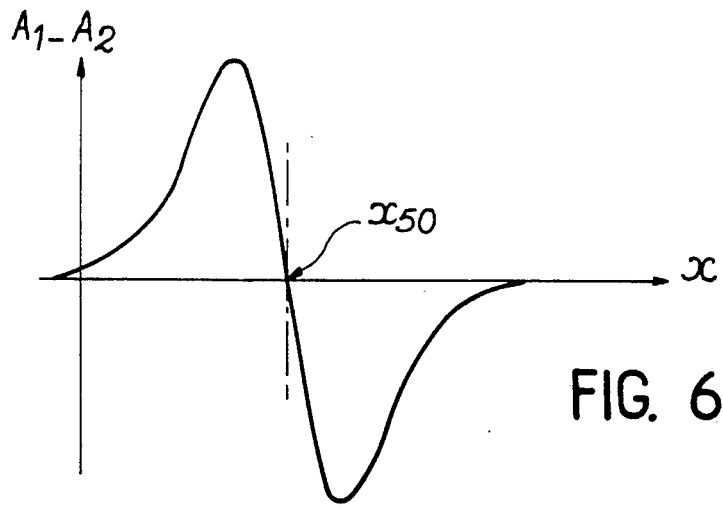
FIG. 6 the shape of the corresponding difference signal.

It is possible to see the uneven or odd character of the curve in FIG. 6, which makes it possible to determine the sign of the variation relative to the axis, in the manner indicated hereinbefore.

Figure 3:
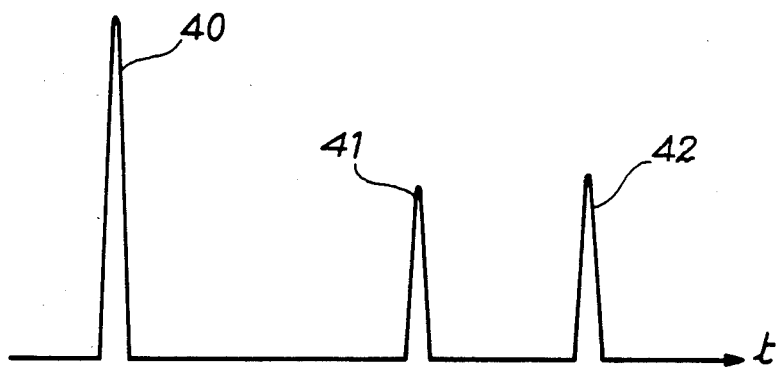
FIG. 3 a graph corresponding to the arrangement of FIG. 2.

The graph of FIG. 5 shows the envelope of the sampled and held signals (supplied by the sample and hold circuits), relative to a spatial variable x and not a time variable t, as in FIG. 3. This means that the two pulses $A_1$ and $A_2$ of FIG. 5 instead of being two echoes of which the difference is formed, are two signals resulting from a special processing of the echoes received. Processing utilizing a difference of a received echoes is already known, but not in connection with the procedure according to the invention. It is a question of subtracting the echoes received in order to eliminate the simultaneous or fixed echoes, whilst only retaining the echoes coming from the object which is of interest. The operation of forming the difference therefore affects the signals such as supplied by the transducers, which are processed in real time, which actually excludes sampling and holding. The difference signal obtained after such a processing is determined relative to time and not relative to space. Such a procedure uses a time comparison, whereas the invention uses an amplitude comparison, the variables used being the probe displacement x and not time. Moreover, such a procedure does not use a time selection gate, which is also the reason why there are multiple echoes coming from obstacles located at various distances.

It should also be noted that the displacement takes place in a clearly defined direction, namely direction X in which are displaced the two focal spots. It is for this reason that it is possible to locate the objects in this direction.

The device according to the invention can easily be inserted into an object position feedback loop. It is merely necessary to consider that the signal $A_1-A_2$ is an error signal useable for correcting the position of the object. This correction takes place in the direction such that the difference signal is cancelled out. This is illustrated in FIG. 1 by the broken line loop 27 starting from circuit 24.

Figure 7:
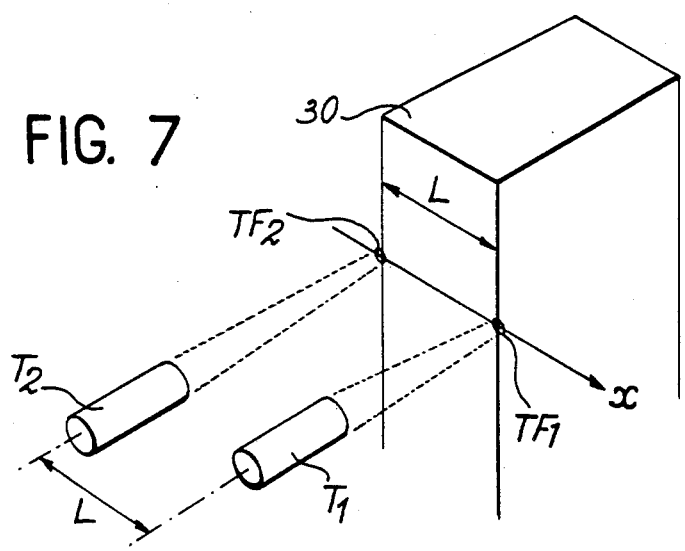
FIG. 7 a case in which the two focal spots are separated by a distance corresponding to the width of the object to be located.
Figure 8:
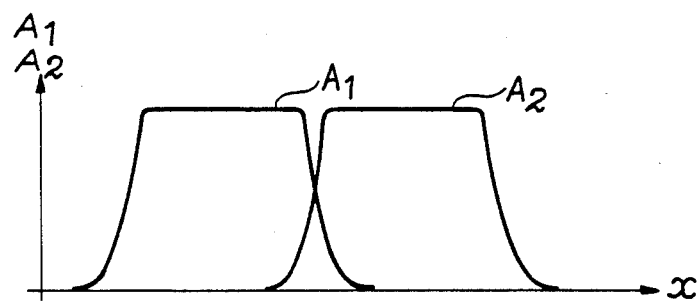
FIG. 8 the shape of two signals obtained in this case.
Figure 9:
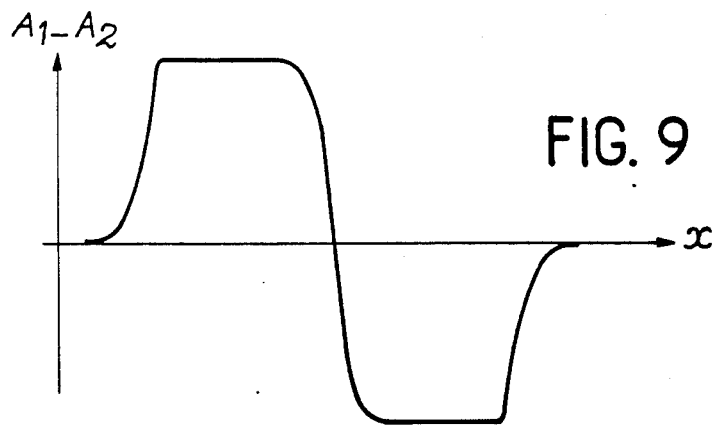
FIG. 9 the shape of the corresponding difference signal.

In the case when it is desired to locate the edge of a rectangular object, like that shown in FIG. 7, the two transducers are disposed in such a way that their focal spots $TF_1$, $TF_2$ are spaced by a distance L, which is precisely the width of the object to be located. The measurement signals $A_1$ and $A_2$ then have the shape shown in FIG. 8 and the difference signal $A_1-A_2$ a shape as shown in FIG. 9, which makes it possible to identify the presence of an object, as shown in FIG. 7. The passage through the zero value of this signal corresponds to the situation shown in FIG. 7, where the focal spot $TF_1$ leaves the right-hand edge of the object, whereas the focal spot $TF_2$ reaches the left-hand edge thereof. The zero passage indicates that the probe is tuned on to the edges of the object or, conversely, if the object moves in front of the probe, that said objects faces the probe at this particular instant.

The two edges are not necessary parallel and the invention can e.g. be used for recognizing a circle, a pentagon, etc.

In the above definition of the invention, the expression "at least two transducers" signifies that it is possible to use probes having more than two transducers $T_1$, $T_2$, $T_3$, etc. The signals supplied by all these transducers are then combined in pairs to form different signals $A_1-A_2$, $A_1-A_3$, $A_2-A_3$, etc., which makes it possible to locate the position of an object in several directions, which are the directions of the pairs of transducers $T_1T_2$, $T_1T_3$, $T_2T_3$, etc. by centering the probe relative to the object.

The electronic means used in the invention are of a conventional nature, because it is essentially a question of exciting ultrasonic transducers and amplifying the signal supplied by them. The originality of the electronic means is based on the presence of a difference signal forming circuit. This circuit can be constituted by a two-input differential amplifier, the inverting input being connected to the amplifier chain associated with one of the transducers and the non-inverting input being connected to the amplifier chain associated with the other transducer.

What is claimed is:

1. A device for locating an object in a plane, said object have a surface located in said plane, said device comprising two ultrasonic emitter-receiver transducers located at a certain distance from said surface, each transducer emitting an ultrasonic focused wave beam directed onto said plane, each beam impinging on said surface and forming thereon a spot, the two spots of the two beams partially overlaping and being displaced with respect to one another, the displacement of the spots defining a direction, said two beams being reflected by the surface of the object and giving rise to two reflected beams directed onto said two transducers, said two transducers suppling two corresponding receiving signals, said device comprising also a receiving signal processing circuit comprising two sample and hold means connected to said two transducers and a difference circuit connected to said sample and hold means, said difference circuit supplying a signal which is responsive to the location of the object with respect to said direction.

2. A device according to claim 1, permitting the position determination of the object, wherein it also comprises means for modifying the position of said transducers relative to the object in said direction.

3. A device according to claim 1, wherein the two transducers are displaced relative to one another in the ultrasonic wave transmission direction, said transducers being supplied by supply circuits which are combined into a single circuit supplying the two transducers in parallel, said transducers being connected to amplification circuits which are combined into a single amplification circuit.

4. A device for locating an object in a plane, said object having a surface located in said plane and having two edges spaced by a given spacing, said device comprising two ultrasonic emitter-receiver transducers located at a certain distance from said plane, each transducer emitting an ultrasonic focused wave beam directed onto said surface, each beam impinging on said surface and forming thereon a spot, the two spots of the two beams being displaced with respect to one another and being at a distance from one another equal to said spacing, the displacement of the beams defining a direction, said two beams being reflected by the surface of the object and giving rise to two reflected beams directed onto said two transducers, said two transducers supplying two corresponding receiving signals, said device comprising also a receiving signal processing circuit comprising two sample and hold means connected to said two transducers and a difference circuit connected to said sample and hold means, said difference circuit supplying a signal which is responsive to the presence and the location of the object with respect to said direction.

* * * * *